(12) United States Patent
Sakai et al.

(10) Patent No.: US 6,774,804 B2
(45) Date of Patent: Aug. 10, 2004

(54) PASSENGER DETERMINATION DEVICE

(75) Inventors: Morio Sakai, Toyota (JP); Koji Aoki, Nagoya (JP); Osamu Fujimoto, Nisshin (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/076,435

(22) Filed: Feb. 19, 2002

(65) Prior Publication Data

US 2002/0118104 A1 Aug. 29, 2002

(30) Foreign Application Priority Data

Feb. 16, 2001 (JP) ........................................ 2001-040769

(51) Int. Cl.⁷ .............................................. G08B 21/00
(52) U.S. Cl. ........................ 340/665; 340/667; 701/45; 180/271; 180/273
(58) Field of Search ................................ 340/665, 666, 340/667, 425.5, 436, 438; 701/45; 180/271, 272, 273

(56) References Cited

U.S. PATENT DOCUMENTS

| | | | | |
|---|---|---|---|---|
| 5,877,677 A | * | 3/1999 | Fleming et al. | 340/436 |
| 5,987,370 A | * | 11/1999 | Murphy et al. | 701/45 |
| 6,012,007 A | * | 1/2000 | Fortune et al. | 701/45 |
| 6,213,510 B1 | * | 4/2001 | Suyama | 280/805 |
| 6,246,936 B1 | * | 6/2001 | Murphy et al. | 701/45 |
| 6,259,167 B1 | * | 7/2001 | Norton | 307/10.1 |
| 6,275,146 B1 | * | 8/2001 | Kithil et al. | 340/425.5 |
| 6,438,477 B1 | * | 8/2002 | Patterson et al. | 701/45 |
| 6,479,766 B2 | * | 11/2002 | Gray et al. | 177/144 |
| 2002/0041236 A1 | * | 4/2002 | Sakai et al. | 340/667 |

FOREIGN PATENT DOCUMENTS

| | | | | |
|---|---|---|---|---|
| JP | 08-020891 | * | 7/1996 | 2/42 |
| JP | 9-207638 A | | 8/1997 | |

* cited by examiner

*Primary Examiner*—Daniel J. Wu
*Assistant Examiner*—Son Tang
(74) *Attorney, Agent, or Firm*—Burns, Doane, Swecker & Mathis, L.L.P.

(57) ABSTRACT

A passenger determination device includes a load sensor attached to a seat main body, a controller for calculating a detected load value on the basis of an outputted load value of the load sensor and for determining a passenger on the basis of a large and small relationship between the detected load value and a predetermined determination threshold value, a load variations detecting device for detecting variations of the detected load value when the large and small relationship between the detected load value and a predetermined determination threshold value changes and a prohibition device for prohibiting from changing the determination of the passenger by the change of the large and small relationship between the detected load value and a predetermined determination threshold value when the detected load variations is small.

4 Claims, 6 Drawing Sheets

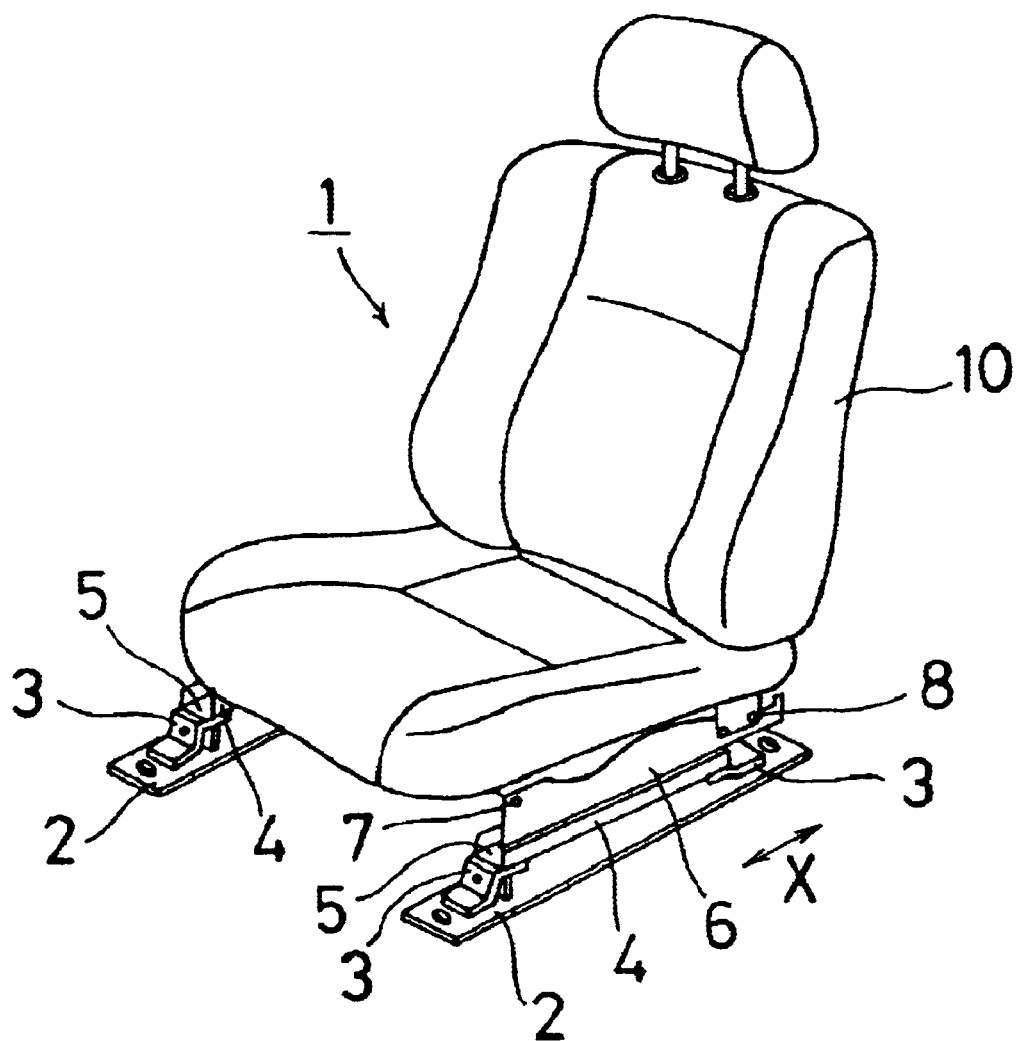

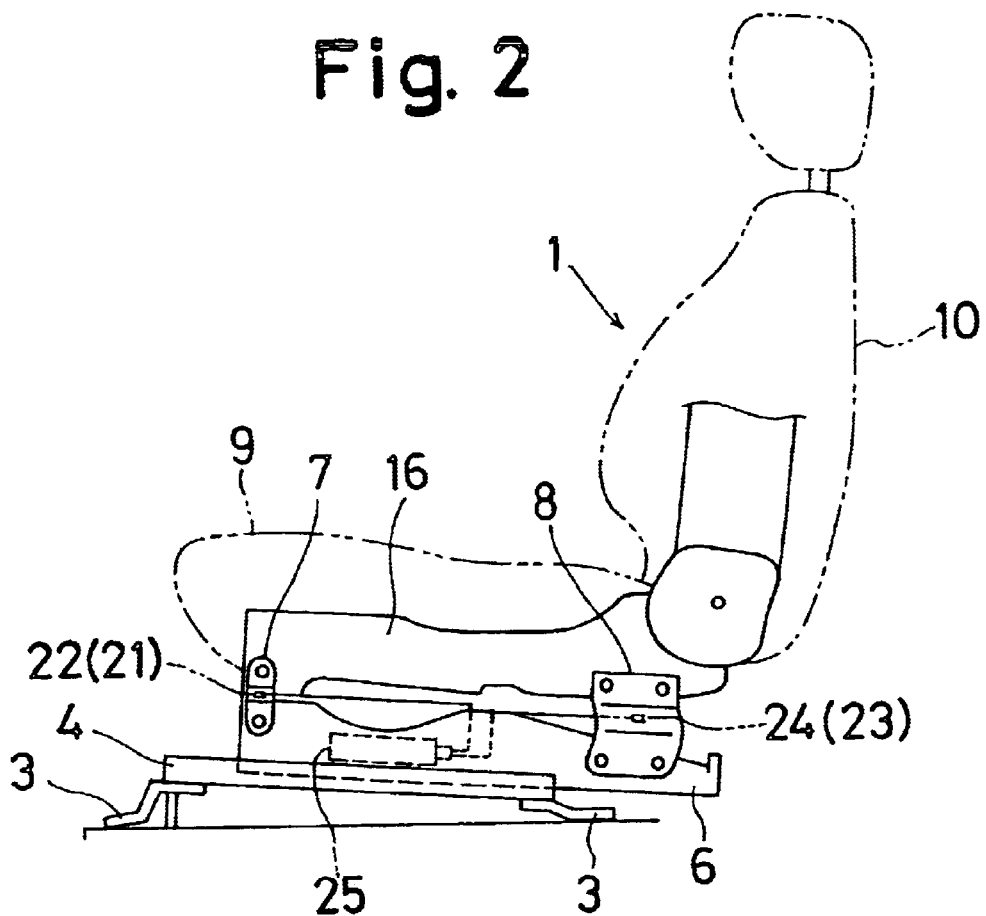
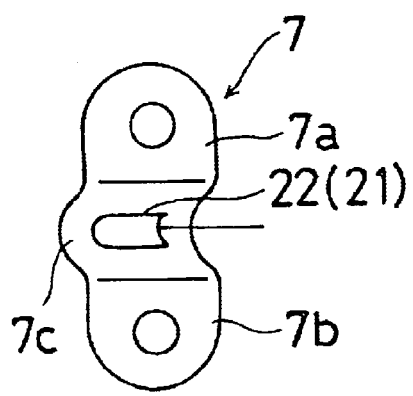
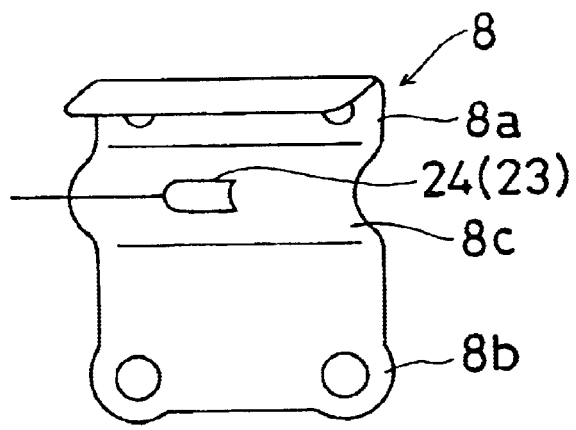

PASSENGER DETERMINATION DEVICE

CROSS REFERENCE TO RELATED APPLICATIONS

This application is based on and claims priority under 35 U.S.C. § 119 with respect to a Japanese Patent Application 2001-040769, filed on Feb. 16, 2001, the entire content of which is incorporated herein by reference.

FIELD OF THE INVENTION

The present invention relates to a passenger determination device which determines the passenger on the basis of outputted load value of a load sensor attached to a seat main body.

BACKGROUND OF THE INVENTION

A vehicle equipped with an air bag may be provided with a passenger determination device to determine whether a passenger is sitting on a seat or whether the seated passenger is an adult or a child. Japanese Patent Laid-Open Publication No. 9-207638 describes an example of a passenger determination device. This device includes a plurality of load sensors attached to plural portions of a seat main body and a controller for calculating a detected load value on the basis of outputted load values of the load sensors and for detecting whether a passenger is sitting on a seat. The controller adds each of the outputted load values of each load sensors by an adder and calculates the detected load value. The controller compares this detected load value with a predetermined load (a determination threshold value) by a determination processing circuit and determines on the basis of the large and small relationship between the detected load value and the threshold value whether a passenger is sitting on a seat.

However, the detected load value of the load sensors is influenced by, for example, a vibration or joggle and so on during the running of a vehicle and varies. Accordingly, in case that the weight of a passenger closes to the threshold value, the determination result is apt to be erroneously changed by the variation of the detected load value.

SUMMARY OF THE INVENTION

It is an object of the present invention to provide an improved passenger determination device which can prevent from erroneously determining a passenger due to the influence of the vibration or joggle and so on during the running of a vehicle.

In order to achieve this objective, there is provided an improved passenger determination device which includes a load sensor attached to a seat main body, a controller for calculating a detected load value on the basis of an outputted load value of the load sensor and for determining a passenger on the basis of a large and small relationship between the detected load value and a predetermined determination threshold value, a load variations detecting means for detecting variations of the detected load value when the large and small relationship between the detected load value and a predetermined determination threshold value changes and a prohibition means for prohibiting from changing the determination of the passenger by the change of the large and small relationship between the detected load value and a predetermined determination threshold value when the detected load variations is small.

BRIEF DESCRIPTION OF THE DRAWING FIGURES

The foregoing and additional features and characteristics of the present invention will become more apparent from the following detailed description considered with reference to the accompanying drawing figures wherein:

FIG. 1 is a perspective view showing a vehicle seat according to an embodiment of the present invention;

FIG. 2 is a side view of the vehicle seat of FIG. 1;

FIG. 3(a) is a front view showing a front sensor bracket;

FIG. 3(b) is a front view showing a rear sensor bracket;

DETAILED DESCRIPTION OF THE INVENTION

Figure 4:
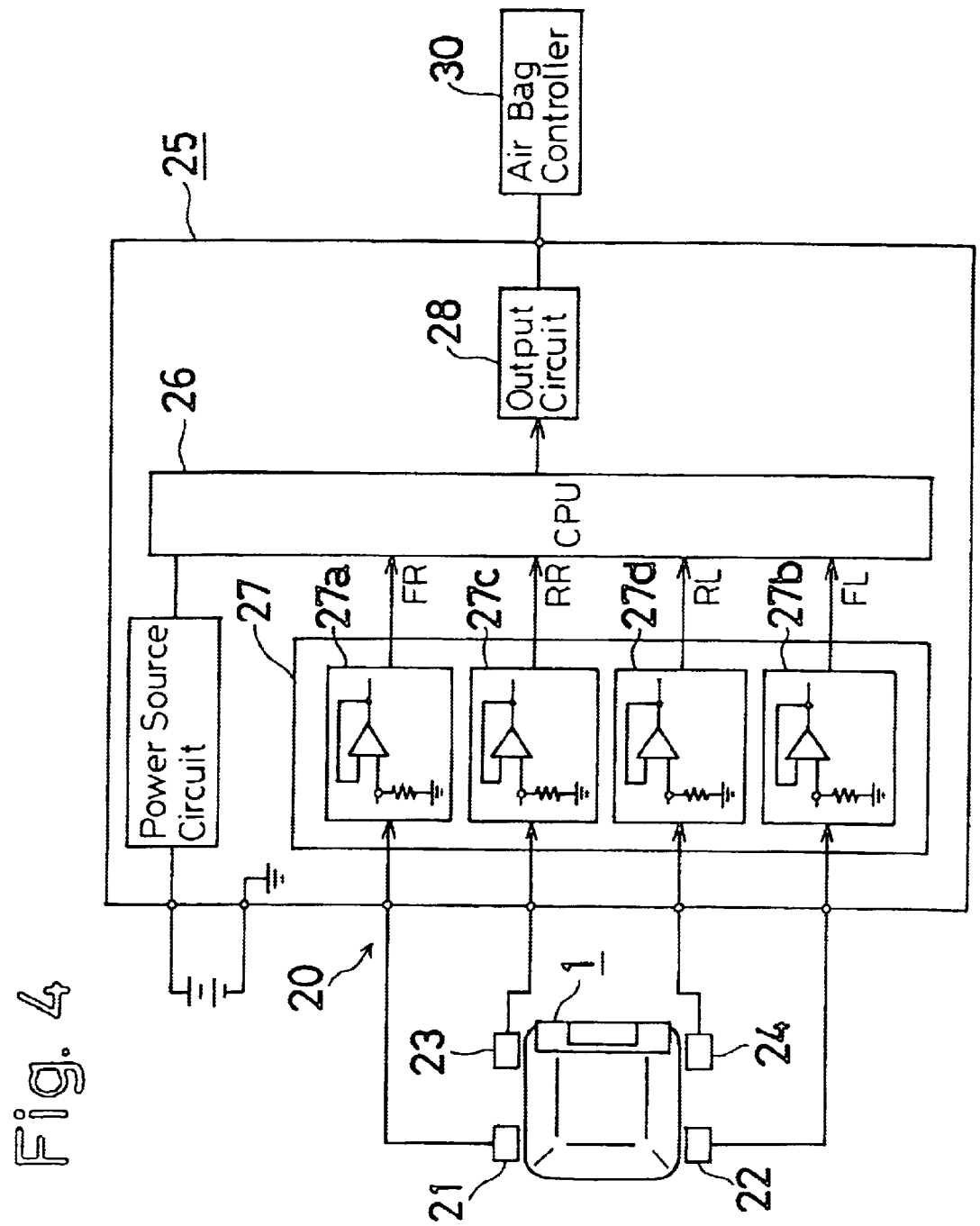
FIG. 4 is a block diagram showing the electrical structure of a passenger determination device according to the embodiment of the present invention.

An embodiment according to the present invention will now be described with references to FIGS. 1 through 7.

FIG. 1 is a perspective view of a seat main body 1 of the vehicle seat according to the present embodiment. The seat main body 1 is a passenger seat adjacent to a driver's seat. In this embodiment, the seat main body 1 is located at the left side of the driver's seat in a forward running direction. A pair of support frames 2, right and left, respectively, are secured to a vehicle floor (not shown) such that the frames 2 extend in frontward and rearward directions (in the direction of arrow X in FIG. 1).

A pair of brackets 3, front and rear, are fastened to the upper sides of each support frame 2. Lower rails 4 are respectively fixed to the brackets 3 along the support frames 2. Each lower rail 4 has a U-shaped cross-section. A slide groove 5, which extends frontward and rearward, is defined in the upper surface of each lower rail 4.

Upper rails 6 are respectively received in the slide grooves 5 and can slide along the corresponding slide grooves 5. As shown in FIG. 2, a pair of lower arms 16, right and left, are connected to each upper rail 6 by a pair of front sensor brackets 7, right and left, and a pair of rear sensor brackets 8, right and left, respectively. The lower arms 16 supports a seat cushion 9 with a predetermined gap and also supports a seat back 10 of the seat main body 1.

As shown in FIG. 3(a), the upper end of each front sensor bracket 7 defines an upper fastening portion 7a and the lower end of it defines a lower fastening portion 7b. A section between the upper and lower fastening portions 7a, 7b is bent to serve as a deformation portion 7c. The upper fastening portions 7a of the front sensor brackets 7 are connected to front portions of the associated lower arms 16. The lower fastening portions 7b of the front sensor brackets 7 are connected to front portions of the upper rails 6, respectively. A right front load sensor 21 is fixed to the deformation portion 7c of the right front sensor bracket 7, and a left front load sensor 22 is fixed to the deformation portion 7c of the let front sensor bracket 7. The right front load sensor 21 and the left front load sensor 22 each include a strain detecting element, such as a strain gauge, which electrically detects the amount of deformation of the deformation portion 7c in accordance with a load applied to the seat cushion 9.

As FIG. 3(b) shows, the upper end of each rear sensor bracket 8 defines an upper fastening portion 8a, and the lower end of it defines a lower fastening portion 8b. The section between the upper and lower fastening portions 8a, 8b is bent to serve as a deformation portion 8c. The upper fastening portions 8a of the rear sensor brackets 8 are connected to rear portions of the associated lower arms 16, and the lower fastening portions 8b of the rear sensor brackets 8 are connected to rear portions of the upper rails 6, respectively. A right rear load sensor 23 is fixed to the deformation portion 8c of the right rear sensor bracket 8, and a left rear load sensor 24 is fixed to the deformation portion 8c of the left rear sensor bracket 8. Like the right front load sensor 21 and the left front load sensor 22, the right rear load sensor 23 and the left rear load sensor 24 each include a strain detecting element, such as a strain gauge, which electrically detects the amount of deformation of each deformation portion 8c in accordance with a load applied to the seat cushion 9.

FIG. 4 is a block diagram showing an electrical structure of a passenger determination device 20 installed in a vehicle seat. The passenger determination device 20 includes the load sensors 21 through 24 and a controller 25.

The controller 25 includes a central processing unit (hereinafter referred to as CPU) 26, a signal Input circuit 27 and an output circuit 28. The signal input circuit 27 includes active filters 27a, 27b, 27c, 27d, which are provided in association with the right front load sensor 21, the left front load sensor 22, the right rear load sensor 23 and the left rear load sensor 24. Load signals, which are supplied from the corresponding load sensors 21 through 24, are input to the CPU 26 via the corresponding active filters 27a through 27d. Each of active filters 27a through 27d is a known low-pass filter. The low-pass filter is a combination of a passive element, which includes a capacitor and a resistor, and an active element, which includes an amplifier. The active filters 27a through 27d allow passage of only low-frequency signals among load signals transmitted from the associated load sensors 21 through 24, and does not allow passage of other signals.

An outputted load value FR is computed based on the load signal transmitted from the right front load sensor 21 through the active filter 27a, and an outputted load value FL is computed based on the load signal transmitted from the left front load sensor 22 through the active filter 27b. Likewise, an outputted load value RR is computed based on the load signal transmitted from the right rear load sensor 23 through the active filter 27c, and an outputted load value RL is computed based on the load signal transmitted from the left rear load sensor 24 through the active filter 27d. The CPU 26 sums up these outputted load values FR through RL and calculates a detected load value S.

Following a control program and using initial data stored in advance, the CPU 26 executes various computing processes and performs various determinations based on the results of the computations. The CPU 26 outputs the results of the determinations to an air bag controller 30 through the output circuit 28. Based on the result of the determinations, the air bag controller 30 controls the actuation of an air bag device (not shown).

Figure 5:
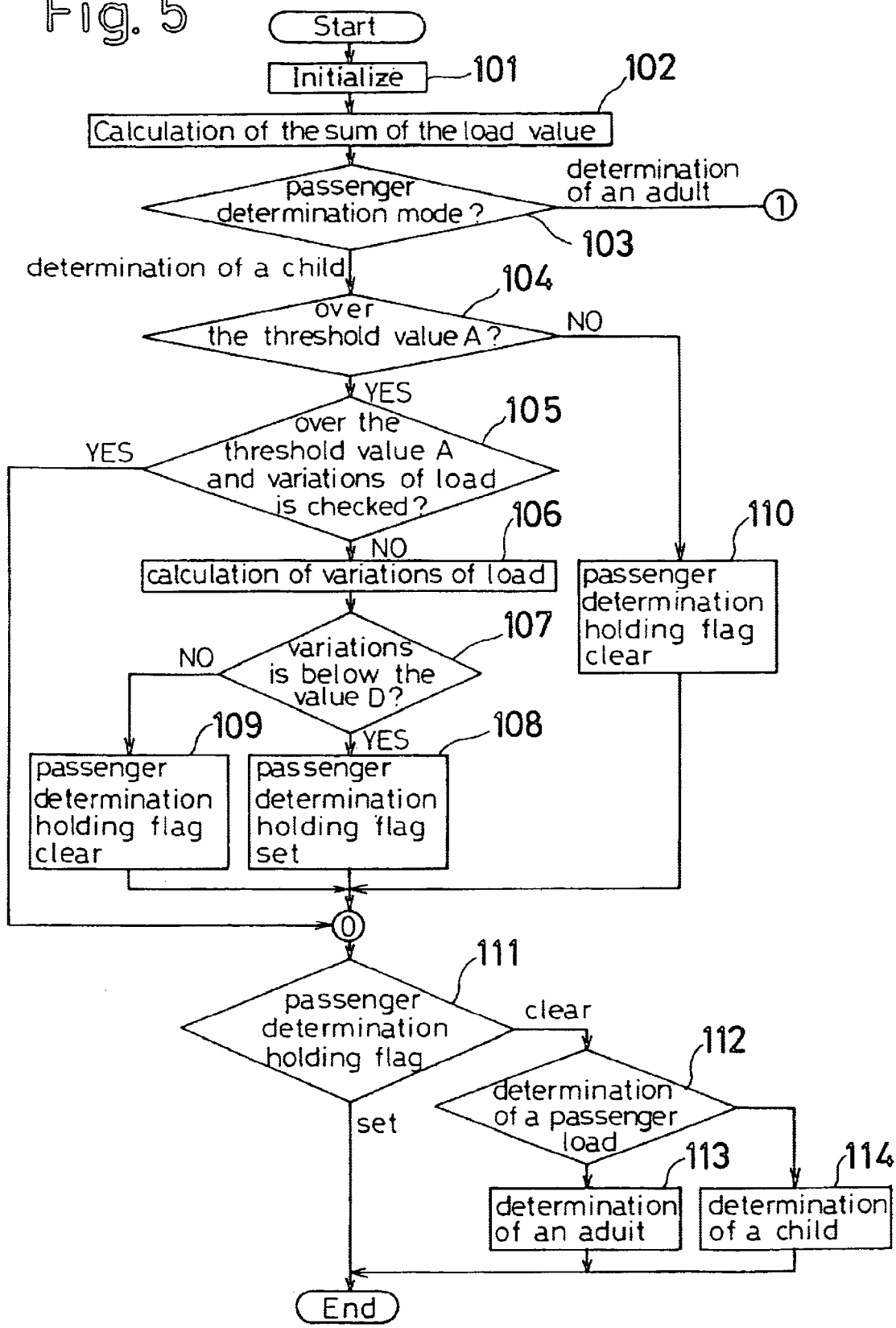
FIG. 5 is a flow chart illustrating a passenger determination routine according to the embodiment of the present invention.
Figure 6:
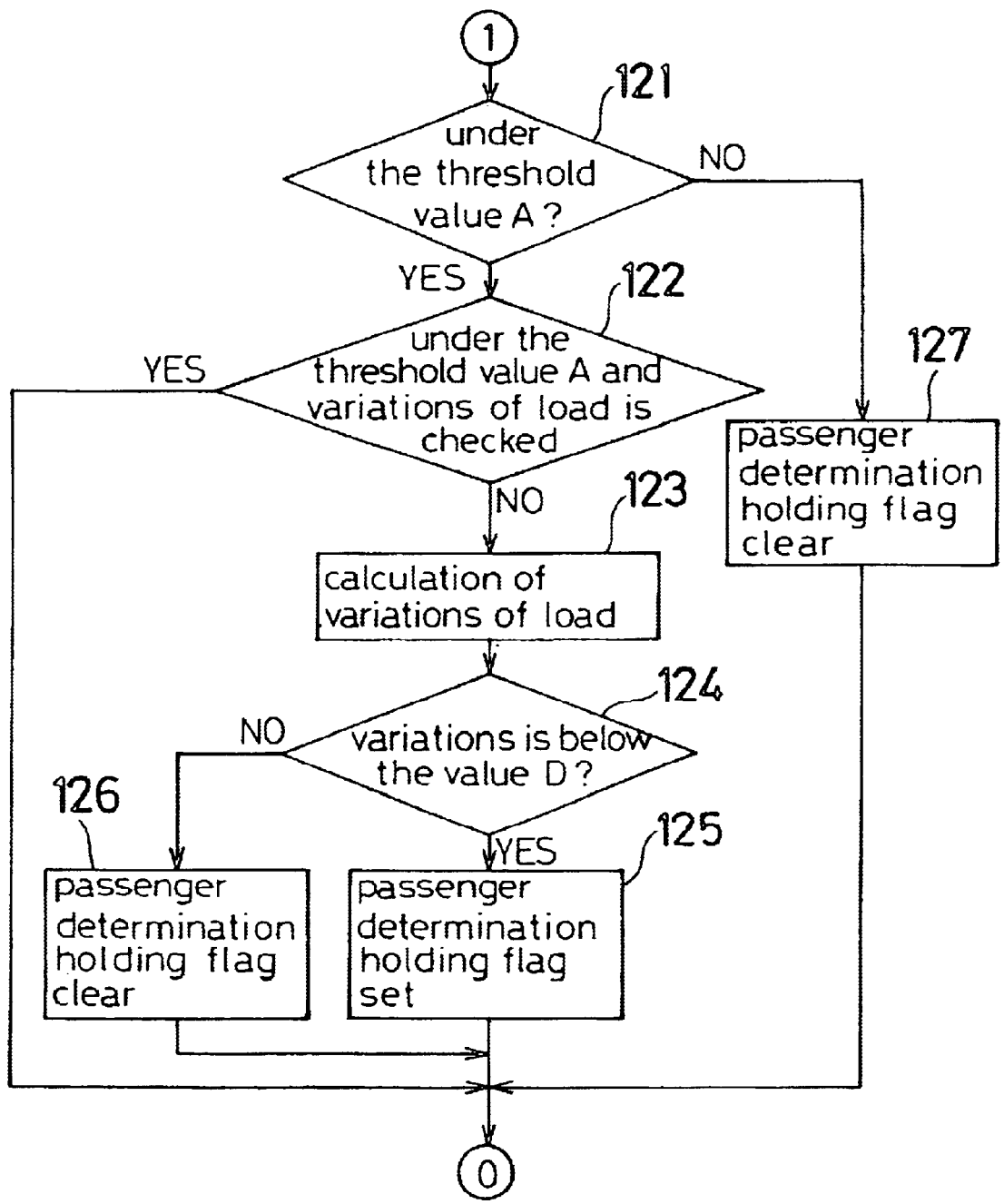
FIG. 6 is a flow chart illustrating a passenger determination routine according to the embodiment of the present invention.

A routine for determining a passenger will now be described with reference to a flow chart shown in FIGS. 5 and 6. This routine is performed with a predetermined interval as interrupt handling.

In the passenger determination routine according to the present invention, the CPU 26 reads in step S101 load signals of the sensors 21 through 24, which have been filtered by the signal input circuit 27. Following the control program and the initial data, both of which are stored in advance, the CPU 26 computes in step S102 the outputted load values FR, FL, RR, RL, respectively, based on the load signals read from the sensor signal input circuit 27. The CPU 26 stores the outputted load values FR, FL, RR, RL into the memory. Additionally, the CPU 26 computes the sum of the outputted load values FR, FL, RR, RL as the detected load value S and stores the detected load value S into the memory. Then, the CPU 26 proceeds to step S103.

In the process of the step S103, the CPU 26 checks a present passenger determination mode. Concretely, the CPU 26 checks a passenger determination flag which is stored in the memory in response to a present passenger determination condition (an adult or a child). In other words, this passenger determination flag shows whether the seated passenger is an adult or a child.

In the step S103, when it is determined by the CPU 28 that the present passenger determination mode is a child mode, the CPU 26 proceeds to step S104. At the step S104, the CPU 26 determines whether the detected load value S is equal with or over a predetermined determination threshold value A. This determination threshold value A is set a value which is suitable for distinguishing between an adult and a child. Namely, when the passenger determination mode is a child mode, the detected load value S is under the determination threshold value A. When the passenger determination mode is an adult mode, the detected load value S is equal with or over the determination threshold value A.

At the step S104, when it is determined that the detected load value S is equal with or over the determination threshold value A, the CPU 26 determines that the determination condition was changed from the condition determined as a child and proceeds to step S105. At the step S105, the CPU 26 determines whether variations Δ of the detected load value is checked or calculated under the condition that the detected load value S is equal with or over the determination threshold value A. This means that the variations Δ of the detected load value is checked or calculated only when the detected load value S becomes over the determination threshold value A.

When the CPU 26 determines that the variations Δ of the detected load value is not checked or calculated under the condition that the detected load value S is equal with or over the determination threshold value A, the CPU 26 proceeds to step S106. At the step S106, present variations Δ of the detected load value is calculated. Concretely, the absolute value of deviation between the present detected load value S and the detected load value calculated at the last processing timing is calculated and the present variations Δ of the detected load value is calculated by the absolute value of the deviation.

Next, the CPU 26 proceeds to step S107 and determines whether the variations Δ of the detected load value is equal with or below a predetermined value D. In general, in case that a vibration or joggle and so on generate during the running of a vehicle, variations Δ of the detected load value becomes smaller when the large and small relationship between the detected load value S and the predetermined determination threshold value A changes. On the contrary, for example, in case that the seated passenger changes from an adult to a child or from a child to an adult, variations Δ of the detected load value becomes larger when the large and small relationship between the detected load value S and the predetermined determination threshold value A changes.

The predetermined value D is set to a value which is suitable for detecting the influence of the vibration or joggle.

When it is determined that the calculated variations Δ of the detected load value is equal with or below the predetermined value D, the CPU 26 determines that the change of the large and small relationship between the detected load value S and the predetermined determination threshold value A is caused by the influence of the vibration or joggle. Then, the CPU 26 proceeds to step S108. At the step S108, the CPU 26 sets a passenger determination holding flag and proceeds to step S111. The passenger determination holding flag holds the present passenger determination condition (the passenger determination flag) regardless of the detection condition of the detected load value S. Accordingly, while the passenger determination holding flag is set, the present passenger determination condition is held.

In the step S107, when it is determined that the variations Δ of the detected load value is larger than the predetermined value D, the CPU 26 determines that the change of the large and small relationship between the detected load value S and the predetermined determination threshold value A is caused by the change of the seated passenger and proceeds to step S109. At the step S109, the CPU 26 clears the passenger determination holding flag and proceeds to step S111.

On the other hand, at the stop S105, when the CPU 26 determines that the variations Δ of the detected load value was checked or calculated under the condition that the detected load value S is equal with or over the determination threshold value A, the CPU 26 proceeds to the step S111.

Further, at the step S104, when it is determined that the detected load value S is under the determination threshold value A, the CPU 26 determines that the determination condition was not changed from the condition determined as a child and proceeds to step S110. At the step S110, the CPU 26 clears the passenger determination holding flag and proceeds to the step 111. On the other hand, at the step S103, when it is determined by the CPU 26 that the present passenger determination mode is an adult mode, the CPU 26 follows the above mentioned process. Namely, when it is determined by the CPU 26 that the present passenger determination mode is an adult mode, the CPU 26 proceeds to step S121 in FIG. 6 and determines whether the detected load value is under the determination threshold value A.

At the step S121, when it is determined that the detected load value is under the determination threshold value A, the CPU 26 determines that the determination condition is changed from the condition determined as an adult and proceeds to step S122. In the step S122, the CPU 26 determines whether variations Δ of the detected load value was checked or calculated under the condition that the detected load value S is under the determination threshold value A. This means that the variations Δ of the detected load value is checked or calculated only when the detected load value S becomes under the determination threshold value A.

When the CPU 26 determines that the variations Δ of the detected load value is not checked or calculated under the condition that the detected load value S is under the determination threshold value A, the CPU 26 proceeds to step S123. At the step S123, present variations Δ of the detected load value is calculated. Next, the CPU 26 proceeds to step S124 and determines whether the variations Δ of the detected load value is equal with or below a predetermined value D. When it is determined that the calculated variations Δ of the detected load value is equal with or below the predetermined value D, the CPU 26 determines that the change of the large and small relationship between the detected load value S and the predetermined determination threshold value A is caused by the influence of the vibration or joggle. Then, the CPU 26 proceeds to step S125. At the step S125, the CPU 26 sets the passenger determination holding flag and proceeds to step S111 in FIG. 5.

In the step S124, when it is determined that the variations Δ of the detected load value is larger than the predetermined value D, the CPU 26 determines that the change of the large and small relationship between the detected load value S and the predetermined determination threshold value A is caused by the change of the seated passenger and proceeds to step S126. At the step S126, the CPU 26 clears the passenger determination holding flag and proceeds to the step S111 in FIG. 5.

On the other hand, at the step S122, when the CPU 26 determines that the variations Δ of the detected load value was checked or calculated under the condition that the detected load value S is under the determination threshold value A, the CPU 26 proceeds to the step S111.

Further, at the step S121, when it is determined that the detected load value S is equal with or over the determination threshold value A, the CPU 26 determines that the determination condition was not changed from the condition determined as an adult and proceeds to step S127. At the step S127, the CPU 26 clears the passenger determination holding flag and proceeds to the step 111 in FIG. 5.

At the step S111, the CPU 26 determines whether the passenger determination holding flag is cleared or set. When it is determined that the passenger determination holding flag is cleared, the CPU 26 proceeds to step S112 and performs a determination of a passenger load. Concretely, the CPU 26 determines the large and small relationship between the detected load value S and the predetermined determination threshold value A. When it is determined that the detected load value S is equal with or over the determination threshold value A, the CPU 26 proceeds to step S113 and performs a determination of an adult. When It is determined that the detected load value S is under the determination threshold value A, the CPU 26 proceeds to step S114 and performs a determination of a child. Then, the CPU 26 ends later processes for the present after setting and storing into the memory the passenger determination flag corresponding to the determination condition. Further, when it is determined that the passenger determination holding flag is set, the CPU 26 ends later processes for the present.

Figure 7:
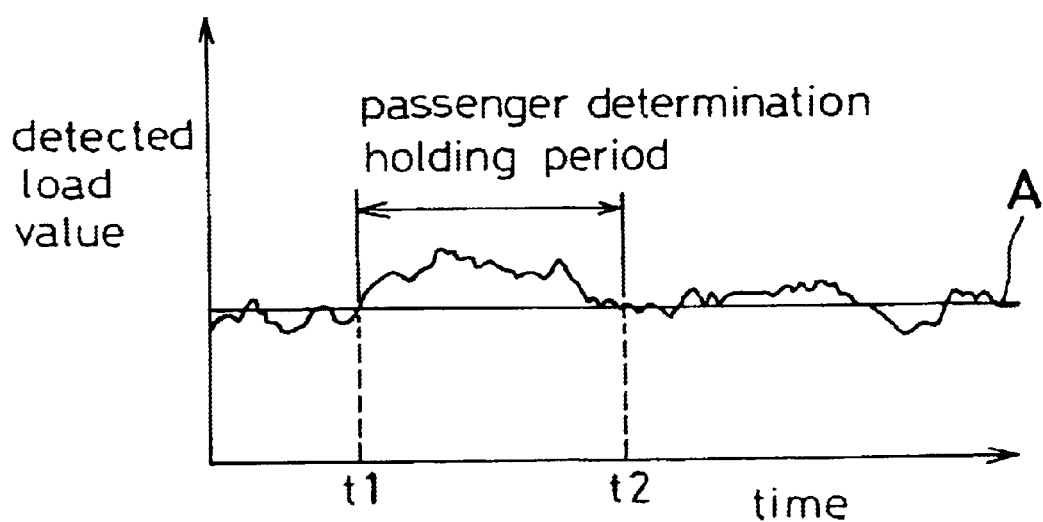
FIG. 7 is graph showing the characteristics of detected load value which is the sum of detected values of each load sensors.

FIG. 7 is a timing chart showing the transition of the detected load value S. As shown in FIG. 7, assuming that the detected load value S was changed from a value under the determination threshold value A to a value over the determination threshold value A at a time t1. Further, assuming that the variations Δ of the detected load value is equal with or below the predetermined value D at the time t1. In this situation, since the variations Δ of the detected load value is smaller, it is determined that a vibration or joggle and so on has been generated during the running of a vehicle and the present passenger determination condition (the condition determined as a child) is held. This passenger determination condition (the condition determined as a child) is held until a time t2 when the detected load value S become under the determination threshold value A again.

According to the embodiment, if the variations Δ of the detected load value is small when the large and small relationship between the detected load value S and the predetermined determination threshold value A is changed, the change of the determination of the passenger is prohibited. Thereby, it is able to prevent the passenger determination device from erroneously determining a passenger due to the influence of the vibration or joggle and so on during the running of a vehicle.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A passenger determination device comprising:

a load sensor attached to a seat main body;

a controller for calculating a detected load value on the basis of an outputted load value of the load sensor and for determining a passenger on the basis of a large and small relationship between the detected load value and a predetermined determination threshold value;

a load variations detecting means for detecting variations of the detected load value when the large and small relationship between the detected load value and predetermined determination threshold value changes; and a prohibition means for prohibiting from changing the determination of the passenger by the change of the large and small relationship between the detected load value and the predetermined determination threshold value when the detected load variations is smaller than a predetermined value.

2. A passenger determination device according to claim 1, wherein the prohibit of the changing the determination of the passenger by the prohibition means is continued until that the large and small relationship between the detected load value and the predetermined determination threshold value is changed again.

3. A passenger determination device comprising:

a plurality of load sensors attached to a seat main body;

a controller for calculating a detected load value on the basis of outputted load values of each load sensor and for determining a passenger on the basis of a large and small relationship between the detected load value and a predetermined determination threshold value;

a load variations detecting means for detecting variations of the detected load value when the large and small relationship between the detected load value and the predetermined determination threshold value changes; and a prohibition means for prohibiting from changing the determination of the passenger by the change of the large and small relationship between the detected load value and the predetermined determination threshold value when the detected load variations is smaller than a predetermined value.

4. A passenger determination device according to claim 3, wherein the prohibit of the changing the determination of the passenger by the prohibition means is continued until that the large and small relationship between the detected load value and the predetermined determination threshold value is changed again.

* * * * *